United States Patent
Leahy et al.

(10) Patent No.: US 11,354,518 B2
(45) Date of Patent: Jun. 7, 2022

(54) MODEL LOCALIZATION FOR DATA ANALYTICS AND BUSINESS INTELLIGENCE

(71) Applicant: Google LLC, Mountain View, CA (US)

(72) Inventors: Andrew Leahy, Scotts Valley, CA (US); Steven Talbot, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 270 days.

(21) Appl. No.: 16/824,902

(22) Filed: Mar. 20, 2020

(65) Prior Publication Data

US 2021/0294987 A1    Sep. 23, 2021

(51) Int. Cl.
  *G06F 40/51*    (2020.01)
  *G06F 40/263*   (2020.01)
(52) U.S. Cl.
  CPC ............ *G06F 40/51* (2020.01); *G06F 40/263* (2020.01)
(58) Field of Classification Search
  CPC ....... G06F 40/51; G06F 40/263; G06F 16/211
  USPC ........................................................... 704/2
  See application file for complete search history.

(56) References Cited

U.S. PATENT DOCUMENTS

2013/0231914 A1    9/2013  Powalowski
2016/0342597 A1    11/2016 Azzam et al.

OTHER PUBLICATIONS

International Search Report, Application No. PCT US/2021/023051, dated Jul. 2, 2021, 15 pages.
Shi et al., "Cross language text classification by model translation and semi-supervised learning," Oct. 9, 2010, 11 pages.

*Primary Examiner* — Thierry L Pham
(74) *Attorney, Agent, or Firm* — Honigman LLP; Brett A. Krueger

(57) ABSTRACT

Embodiments of the invention provide a method, system and computer program product for model localization. In an embodiment of the invention, a method for model localization includes parsing a model to identify translatable terms, generating a seed file associating each of the translatable terms with a corresponding tag and replacing each translatable term in the model with a corresponding tag and submitting each of the translatable terms to machine translation for a target language to produce a different translation file mapping each tag from the seed file with a translated term in the target language of a corresponding one of the translatable terms. Then, the model may be deployed in a data analytics application using the different translation file to dynamically translate each translatable term into a corresponding translated term within a user interface to the data analytics application.

12 Claims, 2 Drawing Sheets

MODEL LOCALIZATION FOR DATA ANALYTICS AND BUSINESS INTELLIGENCE

BACKGROUND OF THE INVENTION

Field of the Invention

The present invention relates to the field of localization of content in a computer program.

Description of the Related Art

In the computing arts, internationalization and localization refers to the adaptation of computer software to different languages, regional peculiarities and technical requirements of a target locale. Historically, localization required the manual coding of the user interface and, where appropriate, the underlying programmatic variables, in the language of the desired locale. More recently, the presentation layer of a computer program has been abstracted to include placeholders which placeholders then may be mapped to local specific terms stored in a table. In this way, only a single abstracted form of the presentation layer of a computer program need be specified, while a selection of different tables for respectively different locales may be provided to localize the presentation layer on demand.

While the foregoing technique for the localization of a presentation layer can be rather efficient, localizing a database is substantially more complicated. One technique for localizing a database is to store different versions of stored data in different languages or different locale customs in different columns of each record. In another technique, one table of the database includes only locale agnostic data while locale specific data are separated into different tables or different rows of one table. But, in all cases, so much obviously has a cost in terms of database size. Localization for a data model implemented in a database also can be achieved in a manner similar to that of localizing the database itself, along with similar consequences.

Of note, in all instances of localization, there is no escaping the requirement of selecting a relevant translated term for each generic placeholder. Thus, the manual intervention of the translator remains of paramount importance. Yet, in so many instances, a term may have different translations depending upon the context in which the term has been used. Yet, once the model has been specified in a localized manner using a selection of translated terms, there is no easy way to correct different translations over time as it is recognized that better translations exist for specific terms in the database model. As such, model localization remains imperfect.

BRIEF SUMMARY OF THE INVENTION

Embodiments of the present invention address deficiencies of the art in respect to localization in data analytics and provide a novel and non-obvious method, system and computer program product for model localization. In an embodiment of the invention, a method for model localization includes parsing a model to identify translatable terms, generating a seed file associating each of the translatable terms with a corresponding tag, including optionally, copying a pre-existing seed file, and replacing each translatable term in the model with a corresponding tag and submitting each of the translatable terms to machine translation for a target language to produce a different translation file mapping each tag from the seed file with a translated term in the target language of a corresponding one of the translatable terms. Then, the model may be deployed in a data analytics application using the different translation file to dynamically translate each translatable term into a corresponding translated term within a user interface to the data analytics application.

In one aspect of the embodiment, the method includes designating an end user of the data analytics application as an authorized translator, presenting in the user interface, each corresponding translated term in a visually distinctive manner and receiving from the authorized translator either an acceptance or a rejection of the corresponding translated term. Then, for each corresponding translated term rejected by the authorized translator, an alternative translation may be received from the authorized translator and the alternative translation may be stored in the different translation file. In another aspect of the embodiment, a change may be detected in the model and the seed file re-generated to account for changes in the translatable terms. Thereafter, each changed one of the translatable terms may be submitted to machine translation for the target language to produce an updated translation file and the model redeployed in the data analytics application using the updated different translation file.

In another embodiment of the invention, a data analytics data processing system is configured for model localization. The system includes a host computing platform that includes at least one computer with memory and at least one processor and fixed storage storing therein, a database model. The system also includes a data analytics application executing in the host computing platform and a machine translator executing in the host computing platform. Finally, the system includes a model localization module that includes computer program instructions enabled during execution in the host computing platform to parse the model to identify translatable terms, to generate a seed file associating each of the translatable terms with a corresponding tag and replacing each translatable term in the model with a corresponding tag, to submit each of the translatable terms to the machine translator for a target language to produce a different translation file mapping each tag from the seed file with a translated term in the target language of a corresponding one of the translatable terms and to deploy the model in the data analytics application using the different translation file to dynamically translate each translatable term into a corresponding translated term within a user interface to the data analytics application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for model localization. In accordance with an embodiment of the invention, a data model is generated for a database and loaded into memory for parsing. During parsing, different translatable terms are identified and each replaced with an associated tag. The associations are then stored in a seed file mapping each tag with a corresponding translatable term. Thereafter, each of the translatable terms in the seed file are submitted to a machine translator for a target language so as to produce a different translation file that maps each tag from the seed file with a translated term in the target language of a corresponding one of the translatable terms. Finally, the model for the database may be deployed in a data analytics application using the different translation file so as to dynamically translate each translatable term into a corresponding translated term within a user interface to the data analytics application without requiring the undesirable bloating of the data model or underlying database and while permitting later, flexible modification of the translations in the translation file without requiring a modification to the underlying database.

Figure 1:
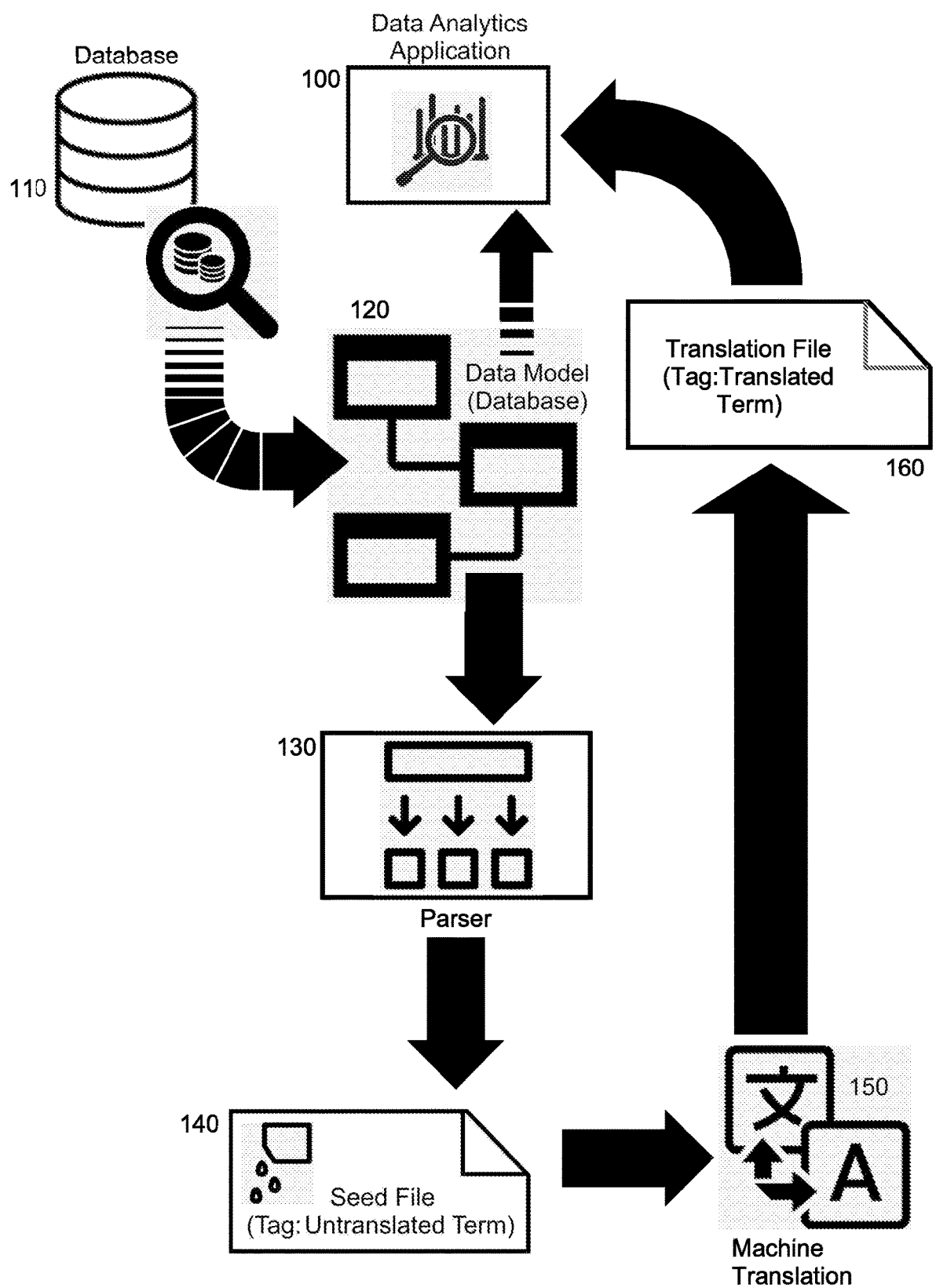
FIG. 1 is pictorial illustration for model localization.

In further illustration FIG. 1 is pictorial illustration for model localization. As shown in FIG. 1, data analytics application 100 analyzes database 110 to produce a data model 120 of the database 110. The data model 120 includes different terms, some of which are translatable from one language to another. The data model 120 is provided to parser 130 which parses the terms of the data model 120 and replaces each translatable term in the data model 120 with a corresponding tag. As well, a seed file 140 is generated mapping each tag with a corresponding one of the translatable terms removed from the data model 120. Optionally, the seed file 140 may be previously generated for a previous version of the data model 120 and simply modified to accommodate updates to the data model 120.

The seed file 140 is then submitted to a machine translator 150 which translates each translatable term into a translated term in a target language. A translation file 160 then stores mappings of each tag from the seed file 140 with a corresponding machine translated term. Finally, when processing the data model 120 in the data analytics application 100, the data analytics application 100 replaces each tag in the data model 120 with a translated term mapped thereto in the translation file 160.

Thereafter, an end user of the data analytics application 100 authorized to modify the translation file 160 may provide in an interface to the data analytics application 100, a recommended translation for a translatable term in the data model 120 that differs from a translation in the translation file 160 produced by the machine translator 150. As well, multiple different alternate translated terms for a tag may be stored in the translation file 160 along with ratings by different end users of the data analytics application 100. A most highly rated one of the alternate translated terms is thus used by the data analytics application 100 in processing the data model 120.

Figure 2:
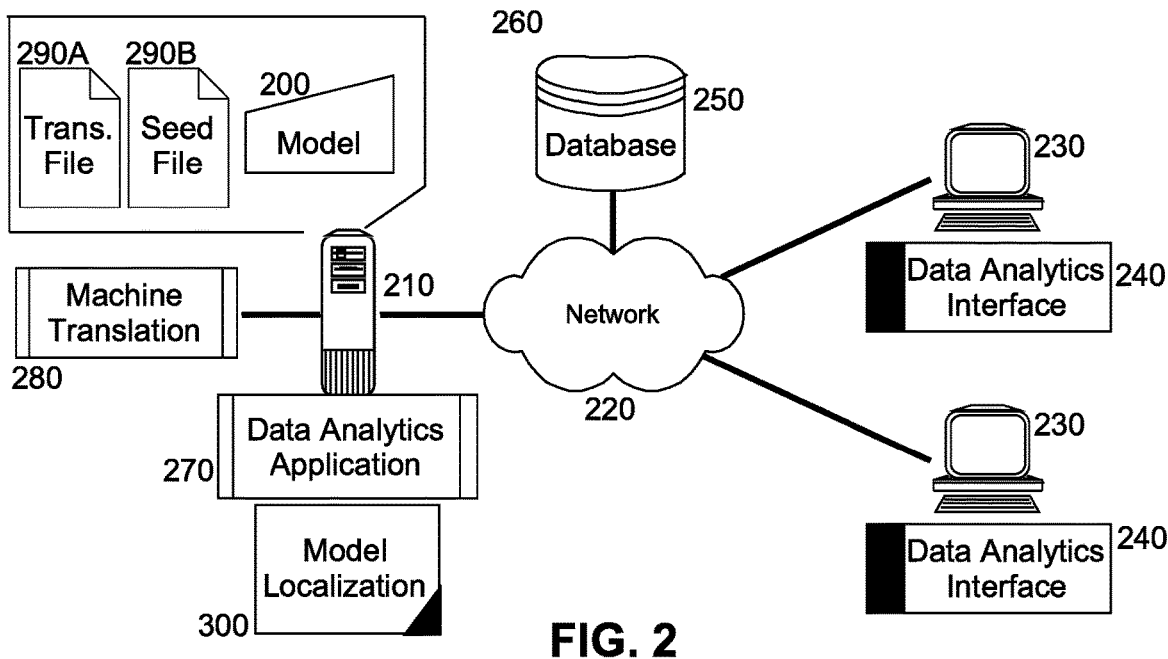
FIG. 2 is a schematic illustration of a data processing system adapted for model localization; and, FIG. 3 is a flow chart illustrating a process for model localization.

The process shown in FIG. 1 may be implemented within a data analytics data processing system. In further illustration, FIG. 2 schematically shows a data processing system adapted for model localization. The system includes a host computing platform 210 that includes memory 260 and at least one processor (not shown). The host computing platform 210 is communicatively coupled to different client computing devices 230 over computer communications network 220. A data analytics application 270 executes in the memory 260 of the host computing platform 210 and receives directives from and provides output to different end users through respectively different data analytics interfaces 240, in performing data analytics on a database 250 by way of a data model 200 generated in the memory 260 of the host computing platform 210 for the database 250.

Of note, the system includes a model localization module 300. The model localization module 300 includes computer program instructions that are enabled during execution in the memory 260 of the host computing platform 210 to parse the data model 200 in the memory 260 to identify translatable terms therein and to replace in the model 200, each translatable term with a unique tag and to map each unique tag with a corresponding translatable term in a seed file 290B. The program instructions further are enabled during execution in the memory 260 to submit the seed file 290B to machine translator 280 executing in the host computing platform 210 to produce in a translation file 290A, translations in a target language for each translatable term in the seed file 290B. Finally, the program instructions of the module 300 are enabled to deploy the translation file 290A for use in the data analytics application 270.

Figure 3:
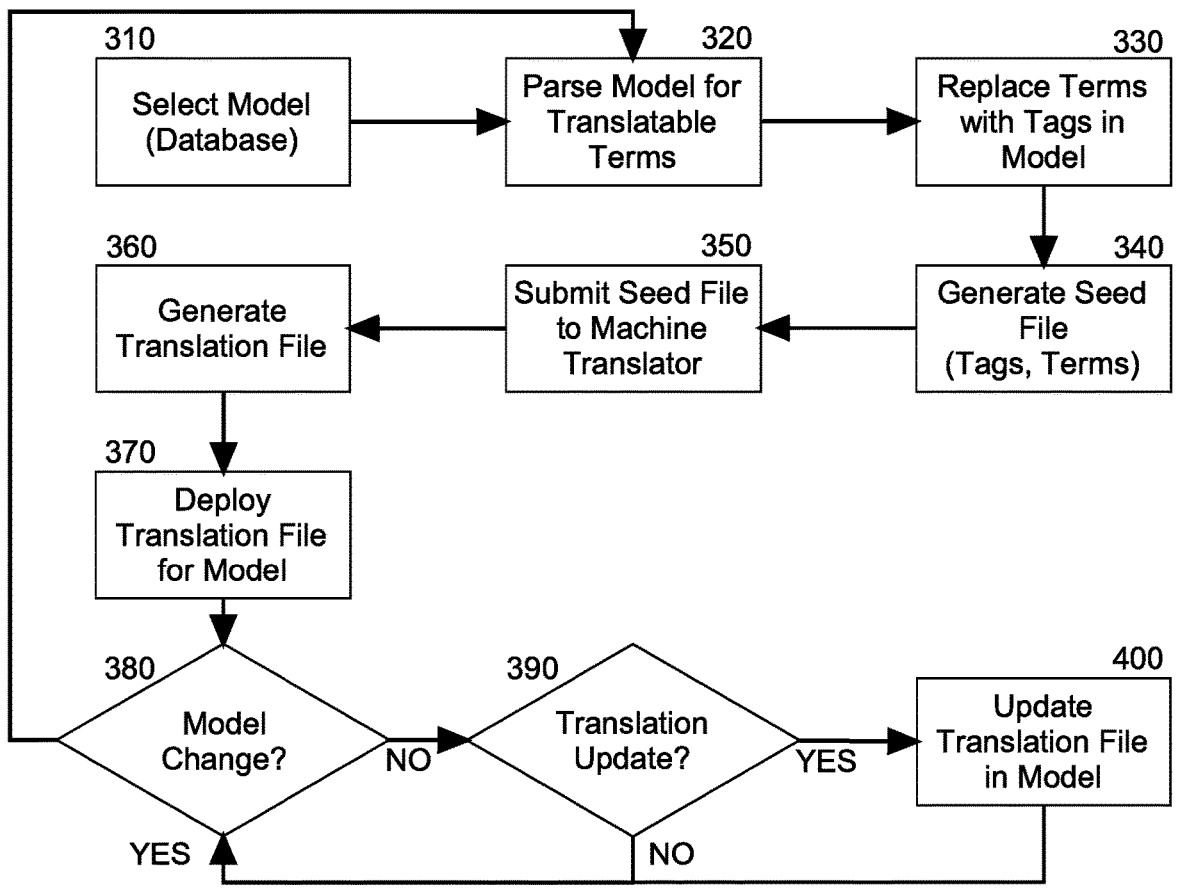

In even yet further illustration of the operation of the model localization module 300, FIG. 3 is a flow chart illustrating a process for model localization. Beginning in block 310, a model is selected for a specified database in the data analytics application. In block 320, the model is then parsed to identify translatable terms, for instance, in reference to a data dictionary of translatable terms so that terms present in both the dictionary and the model are considered translatable. In block 330, the translatable terms in the data model are replaced each with a tag and in block 340, a seed file is generated mapping each translatable term replaced in the data model with a corresponding, assigned tag.

In block 350, the seed file is submitted to machine translation to produce a translation in a target language for each translatable term in the seed file. In block 360, a translation file is generated mapping each tag of the seed file to a corresponding translated term produced by the machine translation. Thereafter, the translation file is deployed for use by the data analytics application in dynamically replacing each tag in the data model with a corresponding translated term in the target language. Of note, in decision block 380, it may be determined if the data model has changed, for instance, owing to a change in the underlying database. If so, the process can return to block 320 with a new parsing of the model to generate a new seed file from which a new translation file may be generated.

As well, in decision block 390, it may be determined if an updated translation has been received for one or more translated terms presented in a user interface to the data analytics application. In this regard, one or more authorized end users of the data analytics application may be presented in the user interface, an indication of a translated term and provided the opportunity to accept or affirm the translation of the translated terms, to input a new translation of the translated term or to rate the translation of the translated term. To the extent that the translated term changes owing to the input, the translation file is updated in block 400 and redeployed to the data analytics application. In this way, the localization of the data model may update dynamically over time without requiring an intrusive, manual modification of the data model itself.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for model localization comprising:
parsing a model to identify translatable terms;
generating a seed file associating each of the translatable terms with a corresponding tag and replacing each translatable term in the model with a corresponding tag;
submitting each of the translatable terms to machine translation for a target language to produce a different translation file mapping each tag from the seed file with a translated term in the target language of a corresponding one of the translatable terms; and,
deploying the model in a data analytics application using the different translation file to dynamically translate each translatable term into a corresponding translated term within a user interface to the data analytics application.

2. The method of claim 1, further comprising:
designating an end user of the data analytics application as an authorized translator;
presenting in the user interface, each corresponding translated term in a visually distinctive manner;

receiving from the authorized translator either an acceptance or a rejection of the corresponding translated term; and, for each corresponding translated term rejected by the authorized translator, receiving from the authorized translator an alternative translation and storing the alternative translation in the different translation file.

3. The method of claim 1, further comprising:

detecting a change in the model;

re-generating the seed file to account for changes in the translatable terms;

re-submitting each changed one of the translatable terms to machine translation for the target language to produce an updated translation file; and, re-deploying the model in the data analytics application using the updated different translation file.

4. The method of claim 1, wherein the seed file is a copy of a pre-existing seed file.

5. A data analytics data processing system configured for model localization comprising:

a host computing platform comprising at least one computer with memory and at least one processor;

fixed storage storing therein, a database model;

a data analytics application executing in the host computing platform;

a machine translator executing in the host computing platform; and, a model localization module comprising computer program instructions enabled during execution in the host computing platform to perform:

parsing the model to identify translatable terms;

generating a seed file associating each of the translatable terms with a corresponding tag and replacing each translatable term in the model with a corresponding tag;

submitting each of the translatable terms to the machine translator for a target language to produce a different translation file mapping each tag from the seed file with a translated term in the target language of a corresponding one of the translatable terms; and, deploying the model in the data analytics application using the different translation file to dynamically translate each translatable term into a corresponding translated term within a user interface to the data analytics application.

6. The system of claim 5, wherein the program instructions further perform:

designating an end user of the data analytics application as an authorized translator;

presenting in the user interface, each corresponding translated term in a visually distinctive manner;

receiving from the authorized translator either an acceptance or a rejection of the corresponding translated term; and, for each corresponding translated term rejected by the authorized translator, receiving from the authorized translator an alternative translation and storing the alternative translation in the different translation file.

7. The system of claim 5, wherein the program instructions further perform:

detecting a change in the model;

re-generating the seed file to account for changes in the translatable terms;

re-submitting each changed one of the translatable terms to machine translation for the target language to produce an updated translation file; and, re-deploying the model in the data analytics application using the updated different translation file.

8. The system of claim 5, wherein the seed file is a copy of a pre-existing seed file.

9. A computer program product for model localization, the computer program product including a computer readable storage medium having program instructions embodied therewith, the program instructions executable by a device to cause the device to perform a method including:

parsing a model to identify translatable terms;

generating a seed file associating each of the translatable terms with a corresponding tag and replacing each translatable term in the model with a corresponding tag;

submitting each of the translatable terms to machine translation for a target language to produce a different translation file mapping each tag from the seed file with a translated term in the target language of a corresponding one of the translatable terms; and, deploying the model in a data analytics application using the different translation file to dynamically translate each translatable term into a corresponding translated term within a user interface to the data analytics application.

10. The computer program product of claim 9, wherein the method further comprises:

designating an end user of the data analytics application as an authorized translator;

presenting in the user interface, each corresponding translated term in a visually distinctive manner;

receiving from the authorized translator either an acceptance or a rejection of the corresponding translated term; and, for each corresponding translated term rejected by the authorized translator, receiving from the authorized translator an alternative translation and storing the alternative translation in the different translation file.

11. The computer program product of claim 9, wherein the method further comprises:

detecting a change in the model;

re-generating the seed file to account for changes in the translatable terms;

re-submitting each changed one of the translatable terms to machine translation for the target language to produce an updated translation file; and, re-deploying the model in the data analytics application using the updated different translation file.

12. The computer program product of claim 9, wherein the seed file is a copy of a pre-existing seed file.

* * * * *